United States Patent
Pfnuer

(10) Patent No.: US 10,048,455 B2
(45) Date of Patent: Aug. 14, 2018

(54) PASSIVE FIBER ARRAY CONNECTOR ALIGNMENT TO PHOTONIC CHIP

(71) Applicant: Cisco Technology, Inc., San Jose, CA (US)

(72) Inventor: Stefan Martin Pfnuer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/997,910

(22) Filed: Jan. 18, 2016

(65) Prior Publication Data
US 2017/0205592 A1  Jul. 20, 2017

(51) Int. Cl.
G02B 6/42 (2006.01)
G02B 6/30 (2006.01)
G02B 6/36 (2006.01)
G02B 6/43 (2006.01)

(52) U.S. Cl.
CPC ............ *G02B 6/4243* (2013.01); *G02B 6/30* (2013.01); *G02B 6/3636* (2013.01); *G02B 6/423* (2013.01)

(58) Field of Classification Search
None
See application file for complete search history.

(56) References Cited

U.S. PATENT DOCUMENTS

| | | | | |
|---|---|---|---|---|
| 4,323,300 A | * | 4/1982 | Stewart | G02B 6/3885 385/59 |
| 4,725,114 A | * | 2/1988 | Murphy | G02B 6/2826 385/59 |
| 5,218,663 A | * | 6/1993 | Isono | G02B 6/122 385/129 |
| 5,297,228 A | * | 3/1994 | Yanagawa | G02B 6/30 359/900 |
| 5,574,811 A | * | 11/1996 | Bricheno | G02B 6/2746 385/130 |

(Continued)

FOREIGN PATENT DOCUMENTS

| | | | | |
|---|---|---|---|---|
| EP | 0532470 A1 | * | 3/1993 | ............... G02B 6/30 |
| EP | 0718649 A1 | * | 6/1996 | ............... G02B 6/30 |

(Continued)

OTHER PUBLICATIONS

Takahara et al., Machine Translation of JP 06-138340 A detailed description, May 1994.*

*Primary Examiner* — Michelle R Connelly
(74) *Attorney, Agent, or Firm* — Patterson + Sheridan, LLP

(57) ABSTRACT

Embodiments herein include an optical system that passively aligns a fiber array connector (FAC) to a waveguide in a photonic chip. An underside of the FAC is etched to include multiple grooves along a common axis or plane. Some of these grooves are used to attach optical cables, or more specifically, the fibers of optical cables to the FAC. To do so, the fibers are placed in the grooves and a lid is disposed on the underside of the fibers to hold the fibers in the grooves. The optical system uses other grooves in the FAC to mate with ridges in the photonic chip in order to mechanically couple the FAC to the photonic chip. By registering respective ridges in the photonic chip with grooves in the FAC, the FAC is passively aligned to the photonic chip along at least one optical axis.

19 Claims, 6 Drawing Sheets

(56) References Cited

U.S. PATENT DOCUMENTS

| | | | | |
|---|---|---|---|---|
| 5,736,429 A * | 4/1998 | Tregoat | ................. | G02B 6/132 |
| | | | | 216/72 |
| 5,984,534 A * | 11/1999 | Elderstig | .............. | G02B 6/3696 |
| | | | | 385/88 |
| 6,118,917 A * | 9/2000 | Lee | ......................... | G02B 6/30 |
| | | | | 385/49 |
| 6,160,936 A * | 12/2000 | You | ......................... | G02B 6/30 |
| | | | | 385/49 |
| 6,847,764 B2 * | 1/2005 | Steinberg | ................. | G02B 6/30 |
| | | | | 385/50 |
| 6,905,256 B2 | 6/2005 | Morse et al. | | |
| 7,234,874 B2 | 6/2007 | Morse et al. | | |
| 7,292,756 B2 | 11/2007 | Moynihan et al. | | |
| 7,317,746 B2 * | 1/2008 | Ericson | ................. | G02B 6/423 |
| | | | | 372/107 |
| 2005/0163431 A1 * | 7/2005 | Moynihan | ............ | G02B 6/1221 |
| | | | | 385/60 |
| 2006/0291782 A1 * | 12/2006 | Carpenter | ................ | G02B 6/30 |
| | | | | 385/49 |
| 2008/0226222 A1 * | 9/2008 | Kim | ......................... | G02B 6/43 |
| | | | | 385/14 |
| 2013/0209026 A1 | 8/2013 | Doany et al. | | |
| 2016/0070074 A1 * | 3/2016 | Wang | ................... | G02B 6/4231 |
| | | | | 385/52 |
| 2016/0291253 A1 * | 10/2016 | Furuya | .................... | G02B 6/30 |

FOREIGN PATENT DOCUMENTS

| | | | | |
|---|---|---|---|---|
| JP | 06138340 A | * | 5/1994 | |
| JP | 11084181 A | * | 3/1999 | |

\* cited by examiner

PASSIVE FIBER ARRAY CONNECTOR ALIGNMENT TO PHOTONIC CHIP

TECHNICAL FIELD

Embodiments presented in this disclosure generally relate to aligning a fiber array connector to a photonic chip.

BACKGROUND

Alignment of optical components to waveguides, such as optical fibers, with high coupling efficiency continues to be a challenge in the photonics industry. To align the optical components actively, dedicated equipment is required which uses a sub-micron resolution multi-stage axis system with integrated cameras to align the components. Moreover, active monitoring of coupled light is often required. Not only is this equipment expensive, active alignment slows down the fabrication process and limits throughput.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
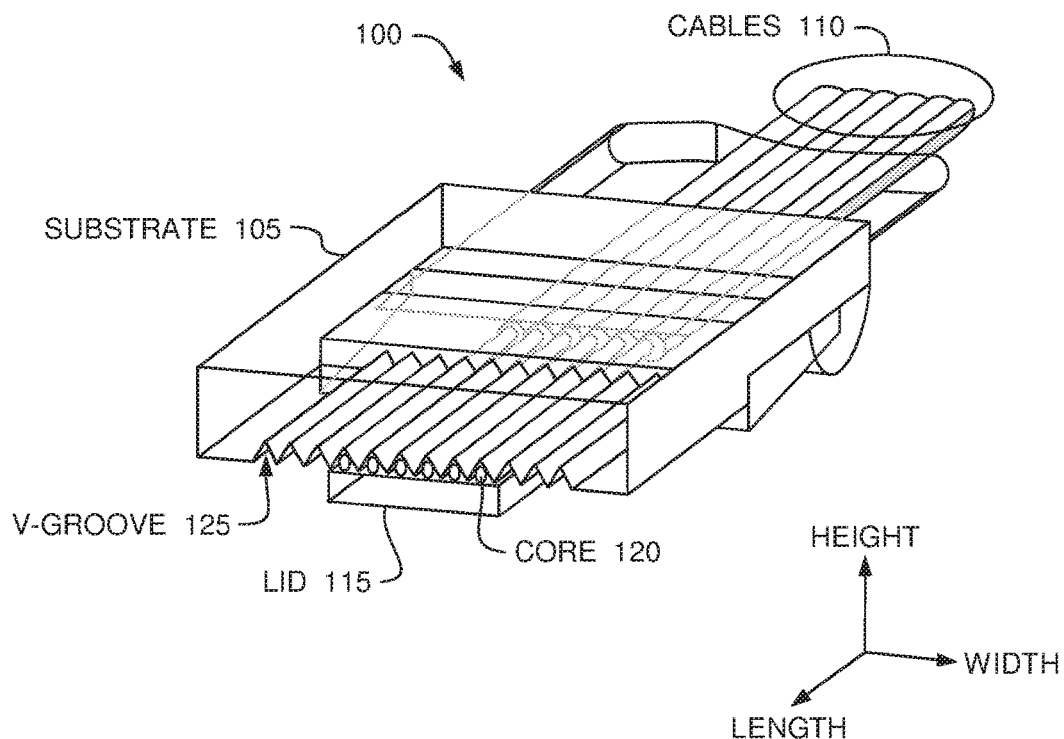
FIG. 1 is a fiber array connector, according to one embodiment described herein.

One embodiment presented in this disclosure is an optical system that includes an optical connector. The optical connector includes a plurality of grooves formed on a common surface of a substrate, a plurality of fibers of optical cables disposed in a first subset of the plurality of grooves, and adhesive material fixing the plurality of fibers to first subset of the plurality of grooves. The optical system includes a photonic chip that includes a plurality of waveguides, a recessed region comprising a bottom surface and a first surface perpendicular to the bottom surface where the plurality of waveguides are exposed on the first surface, and a plurality of ridges disposed on the bottom surface and extending in a direction perpendicular to the bottom surface where each of the plurality of ridges registers with a respective groove in a second subset of the plurality of grooves thereby aligning the plurality of fibers to the plurality of waveguides.

Another embodiment presented herein is a fiber array connector that includes a plurality of grooves formed on a common surface of a substrate, a plurality of fibers of optical cables disposed in a first subset of the plurality of grooves, and a lid where the plurality of fibers is disposed between the lid and the first subset of the plurality of grooves. Moreover, a width of the lid permits a second subset of the plurality of grooves to be exposed on the common surface, where the first subset and the second subset are mutually exclusive.

Another embodiment presented herein is a photonic chip that includes a plurality of waveguides, a recessed region comprising a bottom surface and a first surface perpendicular to the bottom surface where the plurality of waveguides are exposed on the first surface, and a plurality of ridges disposed on the bottom surface and extending in a direction perpendicular to the bottom surface where the plurality of ridges extend from the first surface into the recessed region. Moreover, the plurality of waveguides is disposed between a first ridge of the plurality of ridges and a second ridge of the plurality of ridges along the first surface.

Example Embodiments

Embodiments herein include an optical system that passively aligns an optical component (e.g., a fiber array connector (FAC)) to a waveguide in a photonic chip. An underside of the FAC is machined or etched to include multiple grooves along a common axis or plane. Some of these grooves are used to attach optical waveguides, or more specifically, the fibers of the optical cables to the FAC. To do so, the fibers are placed in the grooves and a lid is disposed on the underside to ensure the fibers contact the sidewalls of the grooves. An adhesive material is used to hold the fibers and lid in place. The remaining grooves in the FAC, however, are used to mate with features in the photonic chip. In one embodiment, the features are ridges in the chip that register with the grooves. By mating respective ridges in the photonic chip with grooves in the FAC, the FAC is passively aligned to the photonic chip along one or more optical axes. More specifically, the fibers disposed in the grooves of the FAC are aligned to respective waveguides in the photonic chip so that optical signals can be transmitted between the FAC and photonic chip.

FIG. 1 is a FAC 100, according to one embodiment described herein. The FAC 100 includes a substrate 105 with a plurality of grooves 125 formed in a common (or same) surface along a common axis. Although V-grooves are specifically shown, in other embodiments, the grooves 125 are U-shaped. In one embodiment, the substrate 105 is made from semiconductor material (e.g., silicon) or from glass.

Some of the grooves 125 are used to secure and align fibers 120 (or optical outputs) of optical cables 110 to the FAC 100. For example, the cables 110 may include a center core, cladding material, buffer coating, and an insulating jacket. In this example, the jackets and buffer coating are stripped off the cables 110 in the portion where the fibers 120 align to the grooves 125. As used here, the fiber 120 may refer to the combination of both the center core and cladding. The diameter of the fiber 120 for a single mode fiber may range from 100 microns to 200 microns.

The fibers 120 of the cables 110 are disposed between the substrate 105 and a lid 115. When fabricating the FAC 100, the fibers 120 of the cables 110 are disposed in the V-grooves 125 while the lid 115 is used to ensure the cables 110 contact the sidewalls of the grooves 125. Put differently, a force may be applied on the lid 115 in a direction towards the substrate 105 so that the optical fibers 120 are properly aligned in the grooves 125. An adhesive material—e.g., an epoxy—can then be used to backfill the spaces between the substrate 105, fibers 120, and the lid 115 such that relative positions between these components are fixed. In one embodiment, the lid 115 is formed from a glass, but could be made from any material that can provide structural support to hold the fibers 120 of the cables 110 in the grooves 125. Moreover, some FACs may not include the lid 115 but instead rely on an adhesive material to fix the fibers 120 in place in the grooves 125.

As shown, the lid 115 covers only a portion of the grooves 125. That is, the width of the lid 115 is less than a total width of all the grooves 125. As a result, at least one v-groove 125 on each side of the lid 115 is exposed in the FAC 100. As described below, the exposed V-grooves 125 are used for mechanical alignment to a photonic chip.

Figure 2:
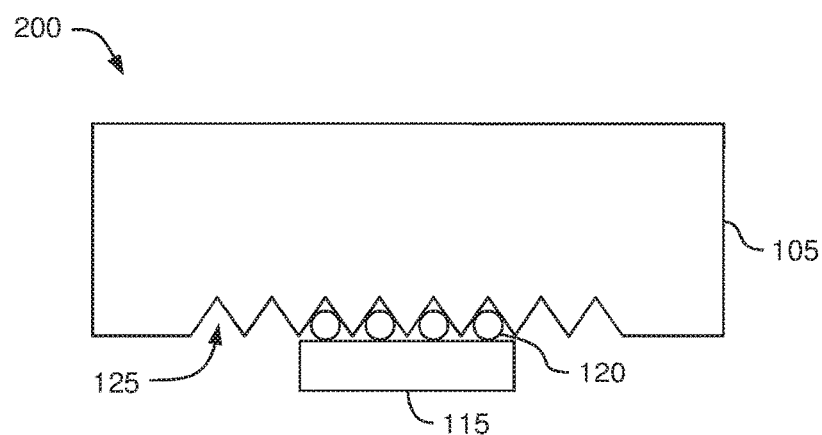
FIG. 2 is a cross section of a fiber array connector, according to one embodiment described herein.

FIG. 2 is a cross section of a FAC 200, according to one embodiment described herein. As shown, the lid 115 secures the fibers 120 of four optical cables to four of the v-grooves 125. However, two of the v-grooves on each side of the lid 115 remain uncovered. As such, the plurality of grooves can be divided into a first subset that includes the v-grooves 125 that are covered by the lid 115 and a second subset of the grooves 125 that is not covered by the lid 115. The first subset of grooves 125 is contiguous, while the second subset is not. That is, while the each of the grooves in the first subset is next to one another, the grooves in the second subset are separated from one another by the grooves in the first subset. In this example, the two v-grooves 125 on either side of the lid 115 are separated by the four v-grooves containing the fibers 120. However, in another embodiment, the first subset of grooves may have non-uniform pitch rather than a constant pitch shown here. Moreover, the grooves containing the fibers 120 do not need to be contiguous. For example, the FAC 200 may include two groups of grooves 125 that include the fibers 120 that are separated by grooves that are used for alignment and do not contain fibers 120.

Figure 3:
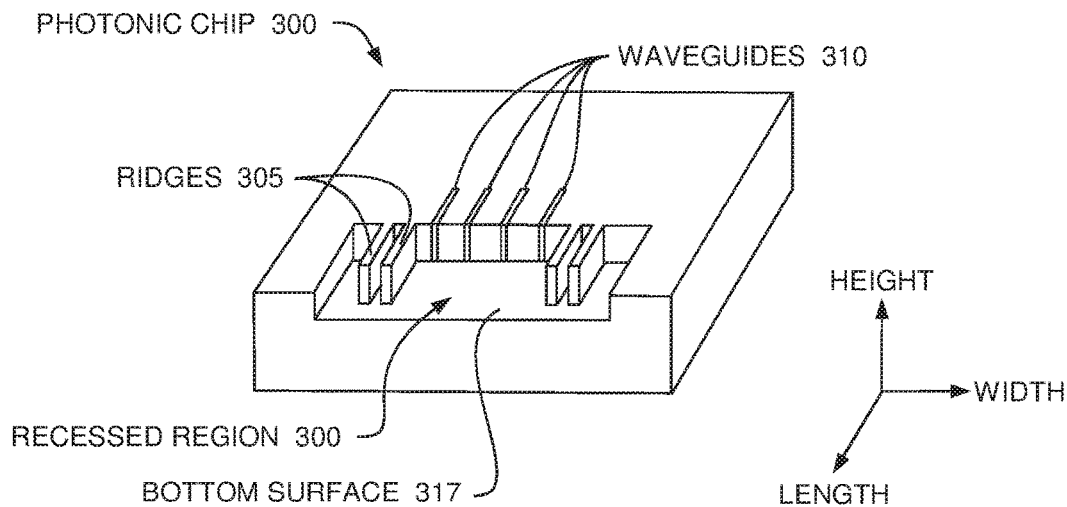
FIG. 3 is a photonic chip, according to one embodiment described herein.

FIG. 3 is a photonic chip 300, according to one embodiment described herein. The photonic chip 300 includes a recessed region 305 which includes multiple ridges 305 (also referred to as stand-offs) that are used for mechanical alignment with a FAC (not shown). Deep reactive-ion etching (DRIE) may be used to form the recessed region 315. Before performing the DRIE process, the portion of the photonic chip 300 where the ridges 305 are desired may be masked such that this portion of the chip 300 is unaffected by DRIE. Thus, performing DRIE removes the portion of the chip 300 around the ridges 305 and forms the recessed region 315. In one embodiment, the height of the recessed region 305 and the ridges 305 is between 300-800 microns. In one embodiment, the height of the recessed region 305 may be greater than the height or thickness of the lid 115 shown in FAC 200. As described below, the recessed region 315 provides a gap in which the lid 115 is disposed with the FAC and the photonic chip 300 are aligned.

The width of the ridges 305 may range from 50 microns to 1000 microns. In one embodiment, the width of the ridges 305 is less than the maximum width of the v-grooves 125 shown in FIGS. 1 and 2. As such, each of the ridges 305 can fit within one of the v-grooves 125 such that the two upper corner edges of the ridge 305 contact the two walls of the v-groove 125. In one embodiment, due to over etching, the base of the ridges 305 near a bottom surface 317 of the recessed region 315 may be narrower than the top of the ridges 305 near the top surface of the chip 300. As such, it may be advantageous to widen the v-grooves so that the width of the ridges 305 can also be increased and still fit within the v-grooves. Widening the ridges 305 means the base of the ridges 305 can be wider and reduce the probability that over etching will cause the ridges 305 to be mechanically instable.

In one embodiment, the ridges 305 can flex in the x-direction. Put differently, the width and height of the ridges 305 permits the ridges to move slightly to absorb imperfections in alignment edges or small pitch mismatches. Also, even though the ridges 305 have multiple contact points with the grooves in the FAC, having some flex in the ridges 305 prevents an overly constrained condition where alignment cannot be achieved. Also, the flex may prevent dust and other debris from preventing alignment when the photonic chip 300 is mated with a FAC.

The photonic chip 300 includes multiple waveguides 310. In one embodiment, the photonic chip is made from a semiconductor material (e.g., silicon), and as such, the waveguides 310 may also be made from silicon. In one embodiment, the height and width dimensions of the waveguides 310 may be less than a micron. As a result, the mode of an optical signal propagating in the waveguides 310 may be around a micron in diameter. Conversely, in a single mode fiber, the mode of the optical signal is approximately the same diameter as the center core of the cable (e.g., 9-10 microns). To accommodate for these different modal dimensions, the waveguides exposed at the recessed region 315 may include waveguide adapters or converters (not shown) that change the mode size of the optical signal. For example, if an optical signal is transmitted from optical cable to the waveguides 310, the adapter shrinks the mode where the waveguides 310 terminate in the recess region 315 thereby improving the coupling efficiency between the waveguides 310 and the optical cable. The reverse is also true where the waveguide adapter increases the mode of optical signals between transmitted from the waveguides 310 to the optical cables.

Although not shown, the waveguides 310 may be coupled to optical components in the photonic chip 300 such as optical modulators (e.g., Mach-Zehnder interferometers, ring resonators, Fabry-Perot cavities, etc.). The photonic chip 300 may also include electrical connections to an electrical integrated circuit (IC) which permit electrical data signals provided by the IC to control the optical components in the photonic chip 300. For example, using a continuous wave (CW) source, the photonic 130 may modulate a CW optical signal and use the waveguides 310 to transmit the modulated signal into the optical cables of the FAC.

Figure 4A:
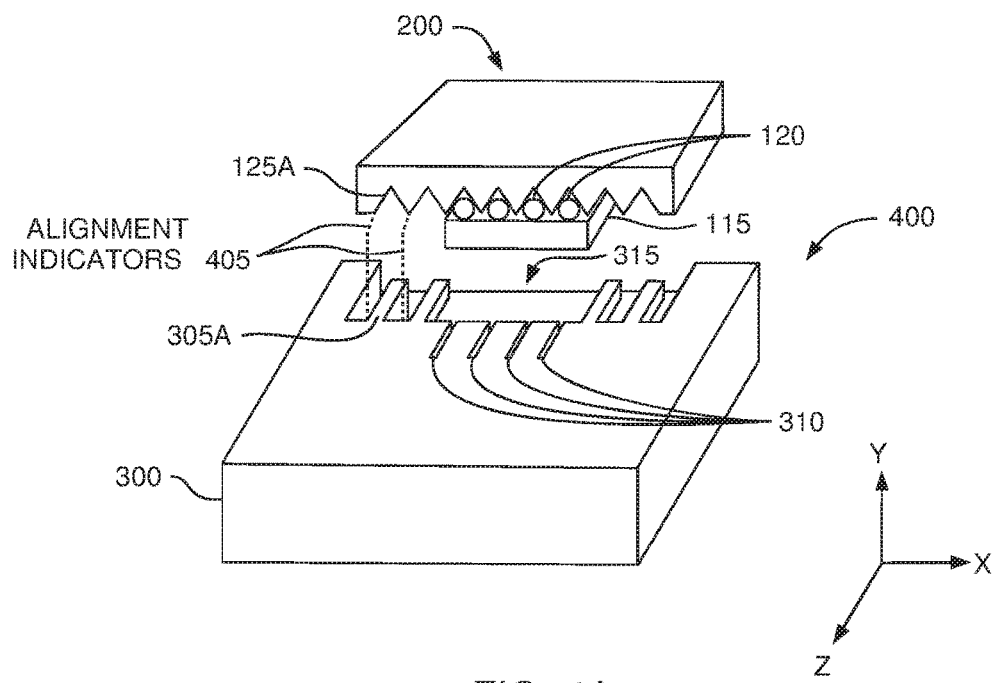
FIGS. 4A and 4B illustrate passively aligning a fiber array connector to a photonic chip, according to embodiments described herein.
Figure 4B:
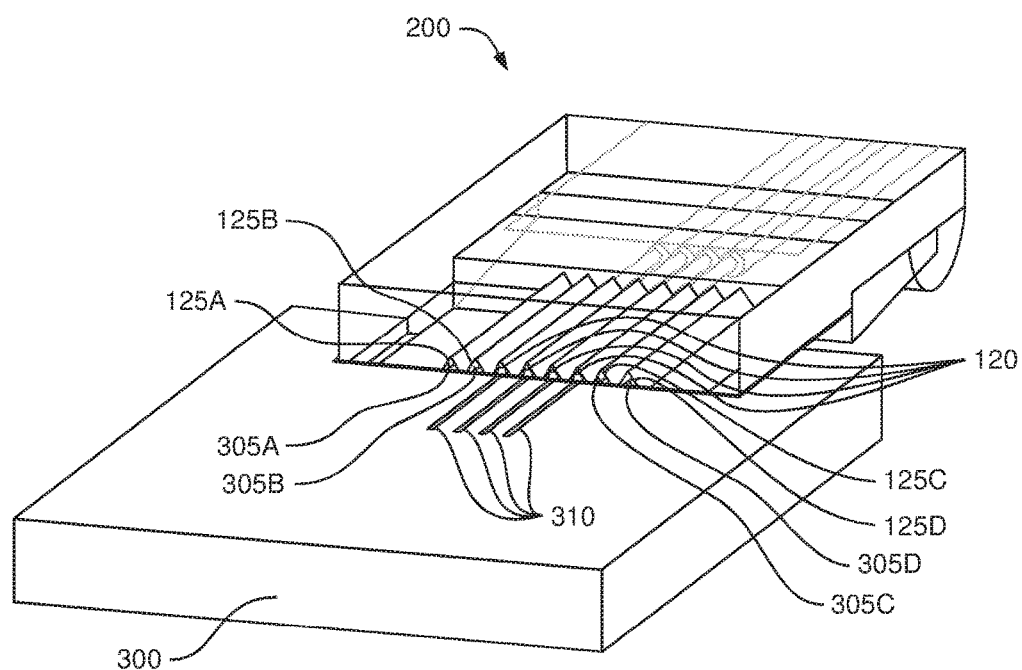

FIGS. 4A and 4B illustrate passively aligning the FAC 200 to the photonic chip 300, according to embodiments described herein. In FIG. 4A, the alignment indicators 405 (i.e., the dotted lines) illustrate registering a ridge 305A with a v-groove 125A. As shown, a human operator or a machine moves the FAC 200 or photonic chip 300 along the alignment indicators 405 until upper edges or corners of the ridge 305A contact or register with the sloped sidewalls forming the v-groove 125A. Although not shown, the other three ridges 305 register with respective v-grooves 125 at the same time the ridge 305A registers with v-groove 125A. When doing so, the lid 115 is disposed into the gap formed by the recessed region 315.

In one embodiment, the location of the ridges 310 in the recessed region 315 and the location of the v-grooves in the FAC 200 are designed such that when the ridges 310 register with the v-grooves 125, the fibers 120 of the optical cables align with the waveguides 310. In one embodiment, the fibers 120 and the waveguides 310 can be passively aligned (i.e., without active alignment steps where an optical test signal is used to align the components) within 1-3 microns in a radial direction in the x-y plane (i.e., the width and height directions). Moreover, the coupling loss of performing passive alignment in one embodiment is less than 50%.

FIG. 4B illustrates the FAC 200 and photonic chip 300 after passive alignment has been performed. As shown, the ridge 305A registers with groove 125A, ridge 305B registers with groove 125B, ridge 305C registers with groove 125C, and ridge 305D registers with groove 125D. As a result, the waveguides 310A-D are passively aligned to a respective one of the fibers 120 of the optical cables.

Figure 5:
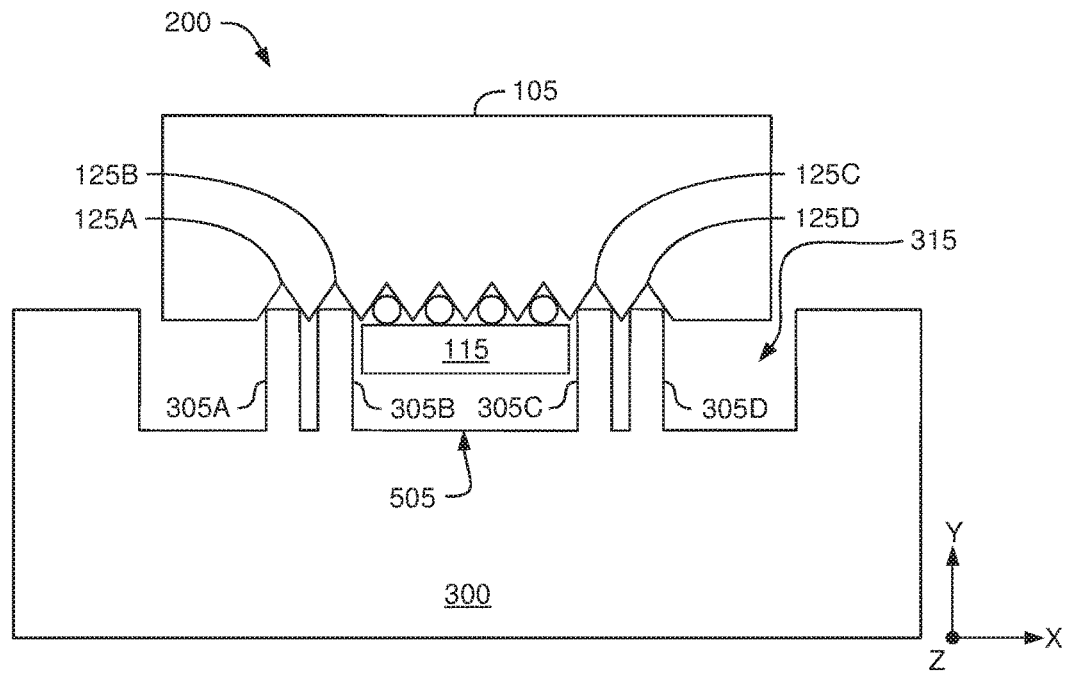
FIG. 5 is a cross section of the fiber array connector and photonic chip illustrated in FIG. 4B, according to one embodiment described herein.

FIG. 5 is a cross section of the FAC 200 and photonic chip 300 illustrated in FIG. 4B, according to one embodiment described herein. As shown, respective corner edges for each of the ridges 305A-D contact a respective sidewall of the grooves 125A-D. Moreover, the lid 115 and at least a portion of the fibers 120 are disposed in the recessed region 315 in order to align the fibers 120 with the waveguides (not shown) in the photonic chip 300.

In one embodiment, the width of the ridges 305 is controlled to establish the alignment of the FAC 200 and the photonic chip 300 in the y direction. For example, as the width of the ridges 305 shrinks, the ridges 305 are recessed further inside the grooves 125. Stated differently, reducing the width of the ridges 305 causes the corners of the ridges 305 to register with the sidewalls of the grooves 125 at locations closer to where the sidewalls meet in the grooves 125. As a result, the separation distance between the FAC 200 and the photonic chip 300 reduces and the FAC 200 is closer to the bottom surface 317 of the recessed region 315. To increase the separation distance between the FAC 200 and the photonic chip 300, the width of the ridges 305 is increased (assuming the width does not exceed the maximum width of the grooves 125). As a result, when aligned, the FAC 200 is further away from the bottom surface 317.

The position of the ridges 305 along the bottom surface 317 determines the alignment of the fibers 120 and the waveguides in the x direction. As mentioned above, when forming the recessed region 315, masks can be used to determine the location of the ridges 305 in the region 315. Moving the ridges 305 in the left or right directions alters the alignment of fibers 120 and the waveguides in the x direction. In this manner, the alignment of the fibers 120 and the waveguides is achieved in the x-y optical plane.

In one embodiment, the techniques used to form the ridges 305 are compatible with typical semiconductor fabrication processes. For example, performing DRIE to form the recessed region 315 and the ridges 305 can be integrated with other semiconductor processes used to fabricate the photonic chip 300. Similarly, the substrate 105 of the FAC 200 can be fabricated using techniques that offer high precision between the sides walls of the individual grooves 125—i.e., within +/−0.5 microns. Moreover, the alignment between the centers of the fibers 120 can be achieved within +/−0.7 microns.

If the material of the substrate 105 is silicon, in one embodiment, the v-grooves 125 can be etched at 54.74 degrees relative to the x-axis along the crystal lattice of the material with a tolerance of +/−0.1 degrees and which results in a height tolerance of +/−0.2 microns. Stated differently, the variance of the angle at which the v-groove 125 is formed can change the separation distance between the FAC 200 and the chip 300 by up to 0.2 microns. If the material of the substrate 105 is glass, in one embodiment, the v-grooves 125 can be machined to have angles ranging from 30-70 degrees with a tolerance of +/−1 degree which can affect the separation distance between the FAC 200 and chip 300 by +/−2.7 microns. Nonetheless, the overall tolerance in the x-y plane may be less than 3 microns.

Referring back to FIG. 4B, passive alignment in the z direction can be achieved by pushing the FAC 200 until a front surface of the FAC 200 contacts the surface in the recessed region 315 on which the waveguides 315 are exposed. Using these two surfaces to align the FAC 200 and the photonic chip 300 in the z direction can achieve a tolerance of +/−10 microns. In one embodiment, the FAC 200 and the photonic chip 300 has greater tolerances in the z direction than in the x and y directions. Stated differently, the FAC 200 and chip 300 may be more tolerant of misalignment in the z direction than in the x and y directions.

Figure 6:
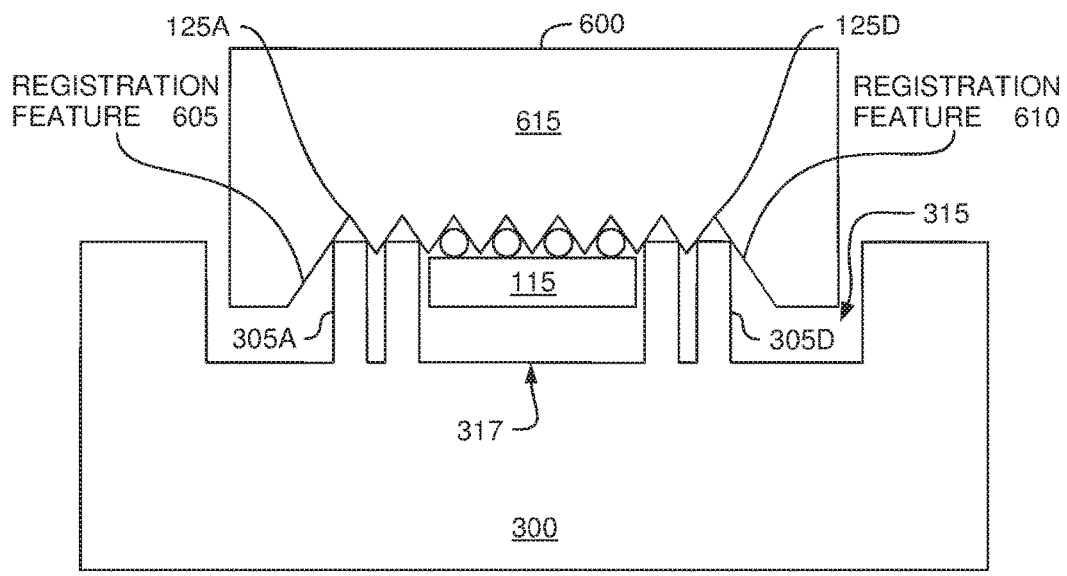
FIG. 6 is a cross section of a fiber array connector and a photonic chip, according to one embodiment described herein.

FIG. 6 is a cross section of a FAC 600 and the photonic chip 300, according to one embodiment described herein. The FAC 600 is the same as the FAC 200 illustrated in FIG. 5 except for the addition of registration features 605 and 610 which are formed on the v-grooves 125A and 125D that are at the ends. As shown, the registration feature 605 extends the left sidewall of v-groove 125A, while the registration feature 610 extends the right sidewall of v-groove 125D. Unlike in FAC 200, in FAC 600, left and right portions of the substrate 615 extend below the v-grooves 125. That is, these portions of substrate 615 extend in a direction towards the bottom surface 317 in order to increase the left and right walls of v-grooves 125A and 125D, respectively, and form the registration features 605 and 610. In one embodiment, the registration features 605 and 610 may extend into the recessed region 315 as far as the lid 115, although this is not a requirement. Moreover, the registration features 605 and 610 may extend into the recessed region 315 farther than the lid 115 so long as the features 605 and 610 do not contact the bottom surface 317 and prevent the ridges 305 from registering with the grooves 125.

In one embodiment, the registration features 605 and 610 are used when registering the ridges 305 to the v-grooves 125. Essentially, the registration features 605 and 610 increase the width of the outer v-grooves 125A and 125B. As such, the features 605 and 610 increase the likelihood that the outer ridges 305A and 305D will lie within the dimensions of the v-grooves 125A and 125D. That is, even if the ridges 305 are shifted to the left such that the center of the grooves 125 is not aligned with the center of the ridges 305, the ridge 305A may still contact the registration feature 605. As the separation distance between the FAC 600 and the photonic chip 300 decreases, the registration feature 605 forces either the FAC 600 or the photonic chip 300 into alignment. In this example, as the FAC 600 moves closer to the chip 300, the registration feature 605 forces the FAC 600 to shift to the left thereby correcting the misalignment between the ridges 305 and the grooves 125. Eventually, as the ridge 305A slides along the registration feature 605, the ridges 305 come into contact with the sidewalls of respective grooves 125, thereby achieving passive alignment.

Conversely, if the ridges 305 are shifted to the right of the v-grooves 125, the rightmost ridge 305D contacts the registration feature 610. As the separation distance decreases the ridge 305D slides along the registration feature 610 until the misalignment is corrected and passive alignment is achieved. In this manner, the registration features 605 and 610 widen out the width of the v-grooves 125 relative to the v-groove arrangement shown in FIG. 5. The registration features 605 and 610 provide a mechanism for correcting misalignment between the FAC 600 and photonic chip 300 when these components are being brought into contact.

Figure 7A:
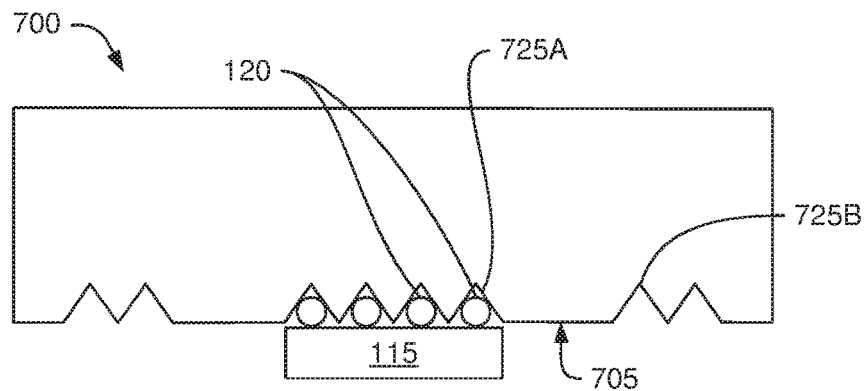
FIGS. 7A-7E illustrate cross sections of different fiber array connectors, according to embodiments described herein.

FIGS. 7A-7E illustrate cross sections of different fiber array connectors, according to embodiments described herein. Specifically, FIG. 7A illustrates a FAC 700 that includes a separation distance 705 between a v-groove 725A that contains the fiber 120 and a v-groove 725B that is used to mechanically couple the FAC 700 to a ridge on a photonic chip (not shown). In one embodiment, the distance 705 is greater than 50 microns.

Figure 7B:
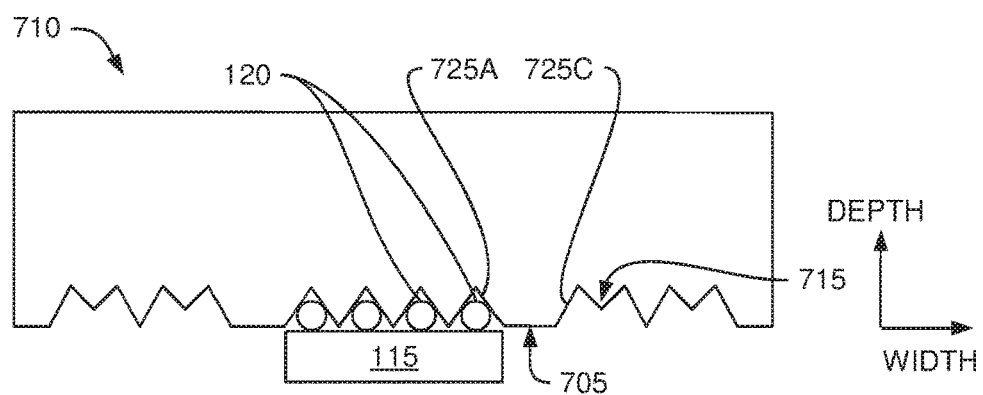

FIG. 7B illustrates a FAC 710 that includes v-grooves of different sizes. Unlike in FAC 700, here, the v-grooves containing the fibers 120 (e.g., v-groove 725A) have different dimensions than the v-grooves used to mechanically couple the FAC 710 to a ridge on the photonic chip (e.g., v-groove 725C). In one embodiment, the angle of the sidewalls of the v-groove 725A may be the same as the angle of the sidewalls of the v-groove 725C; however, the width of the v-groove 725C is greater than the width of the v-groove 725A. As such, the depth (or height) of the v-groove 725C is greater than the depth (or height) of the v-groove 725A.

As shown, the v-grooves used for mechanically coupling (e.g., v-groove 725C) each include a protrusion 715 that extend towards a ridge in the v-groove when the FAC 710 is coupled to the photonic chip (although the protrusion 715 does not contact the ridge). As shown, the sidewalls of v-groove 725C are coupled together via the protrusion 715 to form an M or W pattern. In one embodiment, the protrusions 715 are used when the substrate of the FAC 710 is a glass material which allows current machining techniques to be used when forming the wider v-groove 725C. As discussed above, widening the v-grooves enable the photonic chip to have wider ridges which reduces the harmful effects of over etching and may make the ridges more mechanically stable. In one embodiment, the v-groove 725C may be 50-1000 microns wider than the v-groove 725A used to support the fibers 120 of the optical cables.

In one embodiment, to further increase the width of the v-grooves used for mechanically coupling, the v-groove 725C may include multiple protrusions 715 in a side-by-side arrangement that extend the M or W pattern rather than having only one protrusion 715 in each groove. The protrusions 715 in the same v-groove may all have the same dimensions and be designed such that they do not contact the ridges of the photonic chip when aligned. That is, the ridges contact the sidewalls of the v-groove 725C before they contact the protrusions 715.

Figure 7C:
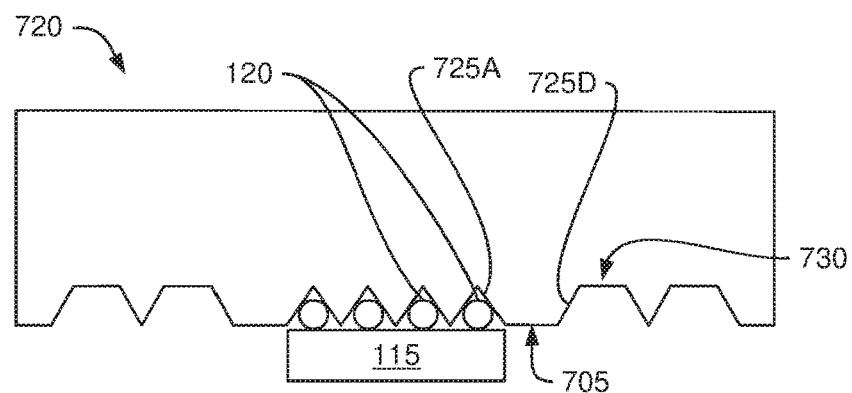

FIG. 7C is a FAC 720 which, like FAC 710, includes v-grooves with different dimensions. In one embodiment, the v-grooves used for mechanically coupling (e.g., v-groove 725D) has a larger maximum width than the v-grooves containing the fibers 120 (e.g., v-groove 725A). Widening the v-grooves enable the use of wider ridges for alignment which, as discussed above, may improve the structural integrity of the ridges.

In FAC 720, the v-grooves used for mechanical coupling include a flat surface 730 connecting the two sidewalls of the grooves. In one embodiment, using a flat surface 730 instead of the protrusion 715 illustrated in FIG. 7B may be preferred when the substrate is made of silicon rather than glass. In one embodiment, the grooves used for mechanical coupling are formed using a chemical etching process—e.g., a potassium hydroxide (KOH) etch.

Figure 7D:
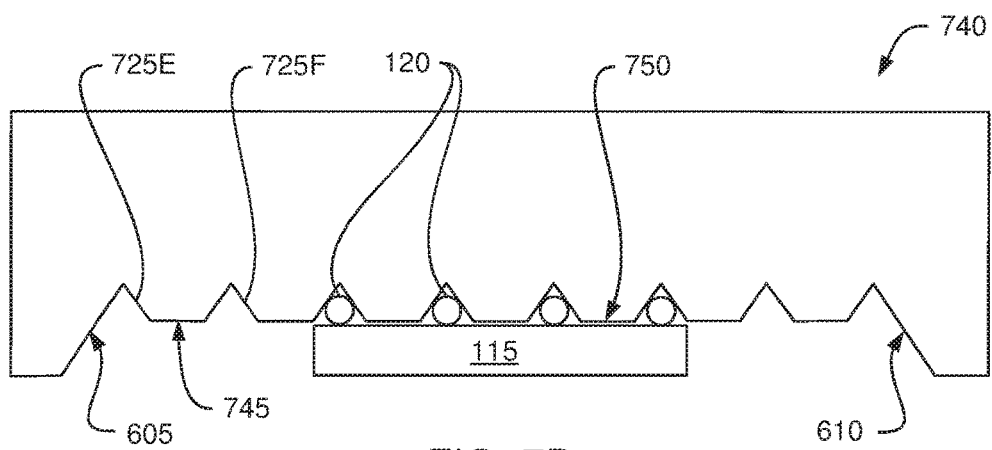

FIG. 7D is a FAC 740 which includes a separation distance 745 separating v-grooves used for mechanical coupling. In this embodiment, the separation distance 745 separates v-groove 725E (which includes the registration feature 605) from v-groove 725F. The separation distance 745 may be preferred when using registration features 605 and 610 to increase overlap between the ridges and the v-grooves as discussed above in FIG. 6. The FAC 740 increases the pitch between the v-grooves (e.g., from 250 microns to 500 microns) which permits a deeper groove depth to form the registration features 605 and 610 without sacrificing precision and adding cost.

Figure 7E:
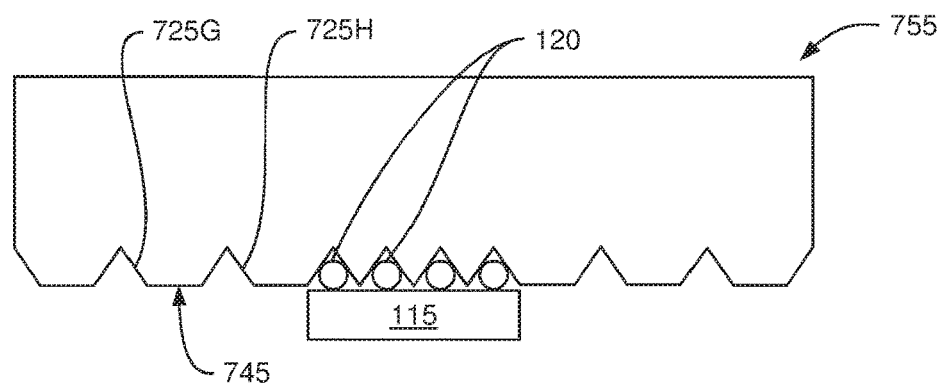

FIG. 7E is a FAC 755 where the v-grooves containing the fibers 120 of the optical cables has a different pitch that than the v-grooves used for mechanical coupling. For example, the v-grooves containing the fibers 120 may have a pitch of 250 microns while the v-grooves used for mechanical coupling have a pitch of 500 microns. However, the dimensions of the individual v-grooves in the FAC 755 may be the same. As shown, the v-grooves used for mechanical coupling—e.g., v-grooves 725G and 725H—are separated by the distance 745 in order to achieve the desired pitch.

Figure 8:
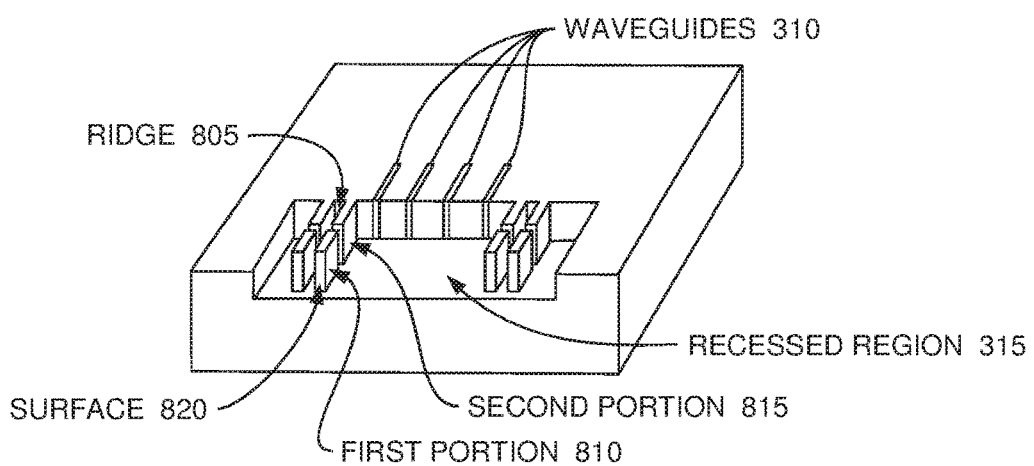
FIG. 8 is photonic chip, according to one embodiment described herein.

FIG. 8 is photonic chip 800, according to one embodiment described herein. The photonic chip 800 includes the recessed region 315 which exposes the waveguides 310 so that the waveguides 310 can be optically coupled to a FAC (not shown). However, instead of including ridges formed from unitary structures, the chip 800 includes ridges 805 that each include a first portion 810 spaced apart from a second portion 815. That is, the first portion 810 is not directly coupled to the second portion 815. In one embodiment, the widths and heights of the first and second portions 810, 815 are the same. The lengths of the first and second portions 810, 815 may be the same or different.

In one embodiment, the first portion 810 has more flex than the second portion 815. That is, when mated to a FAC, the first portion 810 may be able to move or bend more in the x-direction than the second portion 815. As shown, the second portion 815 is coupled to the substrate of the photonic chip 800 along two surfaces: the bottom surface of the recessed region 315 and the side surface of the recessed region 315 on which the waveguides 310 are exposed. In contrast, the first portion 810 is coupled to the substrate of the photonic chip 800 only at the bottom surface of the recessed region 315, and as such, may have more flex than the second portion 815 when all other factors are equal. The more flexible first portion 810 facilitates "lead in" mating where elastic averaging can be achieved. Put differently, when mating the chip 800 to a FAC, the v-grooves in the FAC first contacts the first portions 810 of the ridges 805 before the FAC is slid in a direction towards the waveguides 310 and contacts the second portions 815 for final alignment. In this manner, using a combination of a flexible first portion 810 and a stiffer second portion 815, the photonic chip 800 may achieve alignment with tighter tolerances than using a ridge with a unitary body as shown in the figures above.

Moreover, in one embodiment, the edges of the first portion 810 along the surface 820 facing away from the waveguides 310 are rounded. Round edges may avoid chipping of the first portion 810 and the v-grooves when the photonic chip 800 is mated to the FAC.

In view of the foregoing, the scope of the present disclosure is determined by the claims that follow.

I claim:

1. An optical system comprising:
   an optical connector, comprising:
      a plurality of grooves formed on a common surface of a substrate, wherein the plurality of grooves is at least one of U-shaped and V-shaped,
      a plurality of fibers of optical cables disposed in a first subset of the plurality of grooves, and
      adhesive material fixing the plurality of fibers to the first subset of the plurality of grooves; and
   a photonic chip, comprising:
      a plurality of waveguides,
      a recessed region defined by a bottom surface and a first surface perpendicular to the bottom surface, wherein the first surface intersects the bottom surface, wherein the plurality of waveguides are exposed on the first surface, and
      a plurality of ridges disposed in the recessed region on the bottom surface and extending in a direction perpendicular to the bottom surface, wherein each of the plurality of ridges registers with a respective groove in a second subset of the plurality of grooves thereby aligning the plurality of fibers to the plurality of waveguides.

2. The optical system of claim 1, wherein a respective side of each of the plurality of ridges couples to the first surface of the recessed region, and wherein the plurality of waveguides is disposed between a first ridge of the plurality of ridges and a second ridge of the plurality of ridges along the first surface.

3. The optical system of claim 1, wherein each of the plurality of ridges comprises a top surface opposite the bottom surface, wherein the top surface defines a first edge and a second edge opposite the first edge, and wherein the first edge contacts a first sidewall of the respective groove and the second edge contacts a second sidewall of the respective groove.

4. The optical system of claim 1, wherein all the grooves in the first subset of the plurality of grooves are contiguous, wherein the first subset of the plurality of grooves is between at least a first groove in the second subset of the plurality of grooves and at least a second groove in the second subset of the plurality of grooves.

5. The optical system of claim 1, wherein a first groove is disposed at a first end of the plurality of grooves and a second groove is disposed at a second end of the plurality of grooves, wherein the first groove comprises a registration feature extending a first sidewall of the first groove a greater length than a second sidewall of the first groove, and wherein the second groove comprises a registration feature extending a first sidewall of the second groove a greater length than a second sidewall of the second groove.

6. The optical system of claim 1, wherein the second subset of the plurality of grooves does not contain fibers of optical cables.

7. A fiber array connector (FAC), comprising:
   a plurality of grooves formed on a common surface of a substrate, wherein a first groove is disposed at a first end of the plurality of grooves and a second groove is disposed at a second end of the plurality of grooves, wherein the first groove comprises a registration feature extending a first sidewall of the first groove a greater length than a second sidewall of the first groove, and wherein the second groove comprises a registration feature extending a first sidewall of the second groove a greater length than a second sidewall of the second groove;
   a plurality of fibers of optical cables disposed in a first subset of the plurality of grooves; and
   a lid, wherein the plurality of fibers is disposed between the lid and the first subset of the plurality of grooves,
   wherein a width of the lid is set so that a second subset of the plurality of grooves is exposed on the common surface, wherein the first subset and the second subset are mutually exclusive.

8. The FAC of claim 7, wherein the second subset of the plurality of grooves does not contain fibers of optical cables.

9. The FAC of claim 7, wherein the width of the lid is defined by an axis that is perpendicular to a direction in which the plurality of grooves extend.

10. The FAC of claim 9, wherein all the grooves in the first subset of the plurality of grooves are contiguous, wherein the width of the lid is defined such that the second subset of the plurality of grooves is not covered by the lid.

11. The FAC of claim 10, wherein the first subset of the plurality of grooves is between at least a first groove in the second subset of the plurality of grooves and at least a second groove in the second subset of the plurality of grooves.

12. The FAC of claim 7, wherein depths of the first and second subsets of the plurality of grooves are the same.

13. The FAC of claim 7, wherein depths of the second subset of the plurality of grooves are greater than depths of the first subset of the plurality of grooves.

14. The FAC of claim 13, wherein the substrate comprises silicon, wherein each of the grooves in the second subset is defined by a first sidewall, a second sidewall, and flat surface connecting both the first and second sidewalls, wherein the first and second sidewall are slanted relative to the common surface while the flat surface is parallel to the common surface.

15. The FAC of claim 13, wherein the substrate comprises a glass material, wherein each of the grooves in the second subset is defined by a first sidewall, a second sidewall, and a protrusion connecting both the first and second sidewalls, wherein the first sidewall, the second sidewall, and the protrusion form a W pattern.

16. A photonic chip, comprising:
   a plurality of waveguides;
   a recessed region comprising a bottom surface and a first surface perpendicular to the bottom surface, wherein the first surface intersects the bottom surface, wherein the plurality of waveguides are exposed on the first surface; and
   a plurality of ridges disposed in the recessed region on the bottom surface and extending in a direction perpendicular to the bottom surface, wherein the plurality of ridges extend from the first surface into the recessed region, wherein each of the plurality of ridges includes a first portion and a second portion that does not directly contact the first portion, wherein both the first and second portions contact the bottom surface and extend in the direction perpendicular to the bottom surface, wherein respective widths and heights of the first and second portions are the same, and wherein both the first and second portions are in the recessed region,
   wherein the plurality of waveguides is disposed between a first ridge of the plurality of ridges and a second ridge of the plurality of ridges along the first surface.

17. The photonic chip of claim 16, wherein the plurality of waveguides is disposed between a third ridge of the plurality of ridges and a fourth ridge of the plurality of ridges along the first surface.

18. The photonic chip of claim 16, wherein heights of the plurality of ridges ranges from 100 to 800 microns and the widths of the plurality of ridges ranges from 50 to 1000 microns.

19. The photonic chip of claim 16, wherein a respective side of each of the plurality of ridges couples to the first surface of the recessed region, and wherein the plurality of ridges extends from the first surface into the recessed region in a direction parallel to the bottom surface.

* * * * *

UNITED STATES PATENT AND TRADEMARK OFFICE
CERTIFICATE OF CORRECTION

PATENT NO. : 10,048,455 B2
APPLICATION NO. : 14/997910
DATED : August 14, 2018
INVENTOR(S) : Stefan Martin Pfnuer Page 1 of 1

It is certified that error appears in the above-identified patent and that said Letters Patent is hereby corrected as shown below:

In the Claims

In Column 10, Line 43, in Claim 16, delete "comprising" and insert -- defined by --, therefor.

Signed and Sealed this
Twentieth Day of November, 2018

Andrei Iancu
*Director of the United States Patent and Trademark Office*